(12) United States Patent
Kunerth et al.

(10) Patent No.: US 7,187,299 B2
(45) Date of Patent: Mar. 6, 2007

(54) SYSTEMS AND METHODS FOR MEASURING A PARAMETER OF A LANDFILL INCLUDING A BARRIER CAP AND WIRELESS SENSOR SYSTEMS AND METHODS

(75) Inventors: Dennis C. Kunerth, Idaho Falls, ID (US); John M. Svoboda, Idaho Falls, ID (US); James T. Johnson, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 256 days.

(21) Appl. No.: 10/974,917

(22) Filed: Oct. 26, 2004

(65) Prior Publication Data
US 2005/0207848 A1 Sep. 22, 2005

Related U.S. Application Data

(63) Continuation-in-part of application No. 10/803,517, filed on Mar. 17, 2004.

(51) Int. Cl.
*G08C 19/06* (2006.01)
(52) U.S. Cl. .............................. 340/870.05; 405/129.5; 340/539.1; 340/539.22; 340/870.06
(58) Field of Classification Search ........... 340/870.11, 340/870.05, 870.06, 870.37, 539.1, 539.22; 405/129.5
See application file for complete search history.

(56) References Cited

U.S. PATENT DOCUMENTS

| | | | |
|---|---|---|---|
| 4,636,950 A | 1/1987 | Caswell et al. | |
| 4,656,463 A | 4/1987 | Anders et al. | |
| 5,053,774 A | 10/1991 | Schuermann et al. | |
| 5,440,300 A | 8/1995 | Spillman, Jr. | |
| 5,649,035 A | 7/1997 | Zimmerman et al. | |
| 5,745,049 A | 4/1998 | Akiyama et al. | |
| 5,792,337 A | 8/1998 | Padovani et al. | |
| 5,970,393 A | 10/1999 | Khorrami et al. | |
| 6,240,783 B1 | 6/2001 | McGugin et al. | |
| 6,384,587 B2 | 5/2002 | Aizawa et al. | |
| 6,480,745 B2 | 11/2002 | Nelson et al. | |
| 6,529,127 B2 | 3/2003 | Townsend et al. | |
| 6,617,963 B1 | 9/2003 | Watters et al. | |

(Continued)

OTHER PUBLICATIONS

U.S. Appl. No. 09/665,229, filed Sep. 2000, Slater et al.

(Continued)

*Primary Examiner*—Albert K. Wong
(74) *Attorney, Agent, or Firm*—Wells St. John (57) ABSTRACT

A method of measuring a parameter of a landfill including a cap, without passing wires through the cap, includes burying a sensor apparatus in the landfill prior to closing the landfill with the cap; providing a reader capable of communicating with the sensor apparatus via radio frequency (RF); placing an antenna above the barrier, spaced apart from the sensor apparatus; coupling the antenna to the reader either before or after placing the antenna above the barrier; providing power to the sensor apparatus, via the antenna, by generating a field using the reader; accumulating and storing power in the sensor apparatus; sensing a parameter of the landfill using the sensor apparatus while using power; and transmitting the sensed parameter to the reader via a wireless response signal. A system for measuring a parameter of a landfill is also provided.

42 Claims, 4 Drawing Sheets

U.S. PATENT DOCUMENTS

| | | | |
|---|---|---|---|
| 6,622,567 B1 | 9/2003 | Hamel et al. | |
| 6,624,760 B1 * | 9/2003 | Kinzel et al. | 340/870.11 |
| 6,806,808 B1 | 10/2004 | Watters et al. | |
| 6,825,777 B2 * | 11/2004 | Vock et al. | 340/870.05 |
| 6,836,220 B2 * | 12/2004 | Brown | 340/870.37 |
| 7,061,399 B2 * | 6/2006 | Leck | 340/870.06 |
| 2004/0078170 A1 | 4/2004 | DiMarzio | |

OTHER PUBLICATIONS

News Release—Vibe Powered Sensor, "Sandia Designs Vibe-Powered Sensor That Transforms Shakes into Electricity", Sandia National Laboratories, http://www.sandia.gov/media/NewsRel/NR2002/vibepoweredsensor.htm, 3 pages (2003).

Campus Web Page, "Solutions—Wireless Pressure Transponder", Campus Micro Technologies GmbH, http://www.campus-micro-technologies.de/2_2_8.htm, 1 page (2003).

Slater, John M., et al., "Determining Soil Moisture Over Wide Areas for DOE Site Stewardship Hydrology", Idaho National Engineering and Environmental Laboratory, Environmental Systems Research FY-00 Annual Report, pp. 63-70.

Kunerth, Dennis C., et al., "Monitoring Moisture Content in Surface Barries Using a Passive Sensor Platform", Idaho National Engineering and Environmental Laboratory, INRA Subsurface Science Symposium, 7 pp. (Sep. 6, 2001).

* cited by examiner

SYSTEMS AND METHODS FOR MEASURING A PARAMETER OF A LANDFILL INCLUDING A BARRIER CAP AND WIRELESS SENSOR SYSTEMS AND METHODS

CROSS REFERENCE TO RELATED APPLICATIONS

This application is a continuation-in-part of U.S. patent application Ser. No. 10/803,517, filed Mar. 17, 2004, by inventors Dennis C. Kunerth, John M. Svoboda, James T. Johnson, L. Dean Harding, and Kerry M. Klingler, entitled, "Wireless Sensor Systems and Methods, and Methods of Monitoring Structures".

GOVERNMENT RIGHTS

This invention was made with Government support under Contract No. DE-AC07-99ID13727 between Bechtel BWXT Idaho, LLC and the U.S. Department of Energy. The Government has certain rights in the invention.

TECHNICAL FIELD

Aspects of the invention relate to wireless sensor systems and methods. Aspects of the invention also relate to sensing of subsurface environmental variables.

BACKGROUND OF THE INVENTION

Many government and public entities have landfill sites that need to be remediated. The solution for many of these sites is in-place containment using low permeability layers, barriers, or capillary barriers to control water transport of contaminants. The term "cap" is used hereinafter to describe any of these types of barriers. With this approach, it will be necessary to institute long term monitoring systems to ensure cap performance. System requirements include low maintenance, long lifespan, and economical implementation.

Often, monitoring at closed waste sites is needed for, e.g., 30 years without consideration of additional monitoring. At present, a water moisture monitoring strategy might involve multiple embedded sensors, each wired to a data logger or telemetry unit. The wires present obstacles to heavy equipment at the time of cap (barrier) construction, and subsequent cap maintenance. Use of wired sensors also implies cap penetrations. Any maintenance of sensors requires additional penetrations through the cap.

Monitoring of various parameters is also useful in a variety of other applications. For example, structural integrity of a bridge degrades with time due to environmental conditions. Exposure of bridge structures to harmful materials such as salts promotes oxidation of steel components of such structures. Such oxidation may be due to direct exposure of a bridge structure to harmful material such as chlorides in the salts or it may be due to slow infiltration of chlorides into reinforced concrete sections. Chlorides can corrode the reinforcing steel rebar in concrete bridge decks, requiring regular maintenance to ensure the health and safety of bridges. Although the diffusion rate of chlorides may be slow, the resulting corrosion can expand the volume of reinforcing bars (rebars) of the structure and cause the surrounding concrete to crack. Unless preventive maintenance is performed regularly, bridge life spans can be significantly shortened. Detection of corroding rebar in concrete may be difficult, and efforts to remedy such corrosion may be difficult without performing extensive rebuilding of the structure.

Acquiring knowledge as to when and where to perform such maintenance has typically been a costly and time-consuming process. Current methods for analyzing the levels of chlorides in bridge decks involve extracting concrete core samples and analyzing them in a laboratory setting, which is laborious and time consuming. Many tests are required, since it typically takes several years for critical chloride concentration levels to be reached. During bridge inspection, lanes are typically closed, and the bridge is usually sampled only at a few points along the deck. Accordingly, monitoring costs to identify deterioration of bridge structures can be significant.

Thus, it is desirable to develop improved sensor technologies to overcome the above-noted problems.

SUMMARY OF THE INVENTION

The invention provides a method of measuring a parameter of a landfill including a cap, without passing wires through the cap, includes burying a sensor apparatus in the landfill prior to closing the landfill with the cap; providing a reader capable of communicating with the sensor apparatus via RF; placing an antenna above the barrier, spaced apart from the sensor apparatus; coupling the antenna to the reader either before or after placing the antenna above the barrier; providing power to the sensor apparatus, via the antenna, by generating a field using the reader; accumulating and storing power in the sensor apparatus; sensing a parameter of the landfill using the sensor apparatus while using power; and transmitting the sensed parameter to the reader via a wireless response signal. A system for measuring a parameter of a landfill is also provided.

Aspects of the invention relate to a sensor platform, apparatus or assembly for periodic monitoring/sensing of environmental variables such as, for example, moisture, temperature, pressure, contamination, or radiation. In some embodiments, a sensor platform is inactive until energized by a reader configured to provide power to the sensor platform. The sensor platform communicates with the reader via short-range telemetry. A short range induction field generated by the reader powers the sensor platform. In some embodiments, the induction field also carries information from the sensor platform via a response signal.

More particularly, aspects of the invention relate to wireless sensor systems and methods.

In some embodiments, a wireless sensor system includes a reader configured to generate an induction field, and a sensor platform configured to sense various parameters. The sensor platform is communicatively linked to the reader and is in a passive state until energized by the reader. The sensor platform includes processing circuitry, a resonant antenna configured to communicate data between the sensor platform and the reader, the resonant antenna being configured to collect energy from the induction field in order to energize the sensor platform. The sensor platform also includes one or more sensors configured to measure one or more parameters. A measurement (or measurements) obtained by the sensor or sensors is transmitted via a response signal in a return field to the reader. The sensor platform also includes charging circuitry configured to collect and store energy received from the induction field. In some embodiments, the charging circuitry is able to collect and store energy while the sensor or sensors is sensing. In some embodiments, the reader includes a transceiver configured to communicate with the sensor platform, an antenna, a communications interface coupled to the antenna, and a microprocessor configured to control operations of the reader. In some embodiments, the reader is configured as a user-interface to the sensor platform wherein multiple individual sensors of the sensor platform are independently interrogated.

In other embodiments, a wireless sensor system includes one or more passive sensor platforms buried above or under a cap to sense various environmental parameters. A reader that is near the surface or above ground communicates with the sensor platform. Power is supplied by the reader, in some embodiments.

More particularly, some aspects of the invention provide a low power sensor platform used for periodic, remote sensing of environmental variables such as subsurface volumetric moisture, temperature, pressure, and water potential, contamination, and/or radiation. The sensor platform supports multiple sensors. The specific target for this technology is long term monitoring of landfill barrier caps. The key characteristic of the platform architecture is that all platform components are inactive until energized by a remote power source, thus no internal power source such as a battery is required. Another characteristic is that the platform communicates via short-range telemetry, i.e., no wires need penetrate to the subsurface or through a barrier. This is useful when it is desirable to avoid having wires penetrate a barrier or where subsurface sensors need to be protected from surface environmental hazards such as lightning strikes or vandalism. Other significant attributes include the potential for a long service life and a compact size that makes it well suited for retrofitting existing structures.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
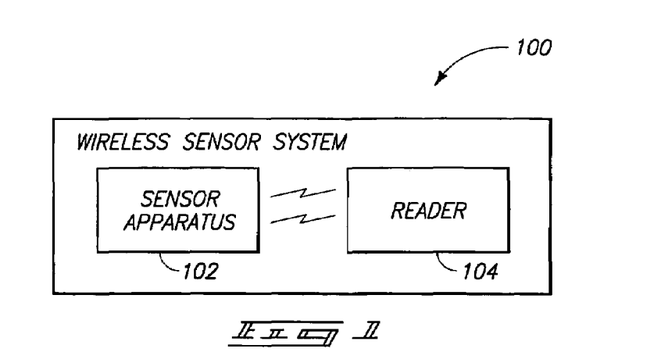
FIG. 1 is a high-level block diagram of a wireless sensor system in accordance with various embodiments, and including a sensor platform and reader.

Referring to FIG. 1 a high-level block diagram of a wireless sensor system arranged according to some embodiments is shown. The depicted sensor system 100 includes a sensor platform, apparatus, or assembly 102 and a reader 104. The sensor platform 102 may be alternatively referred to as a sensor platform or sensor assembly. The reader 104 may be coupled to a local or remote device or computer or data logger. In alterative embodiments, the reader 104 includes a data logger.

Figure 2:
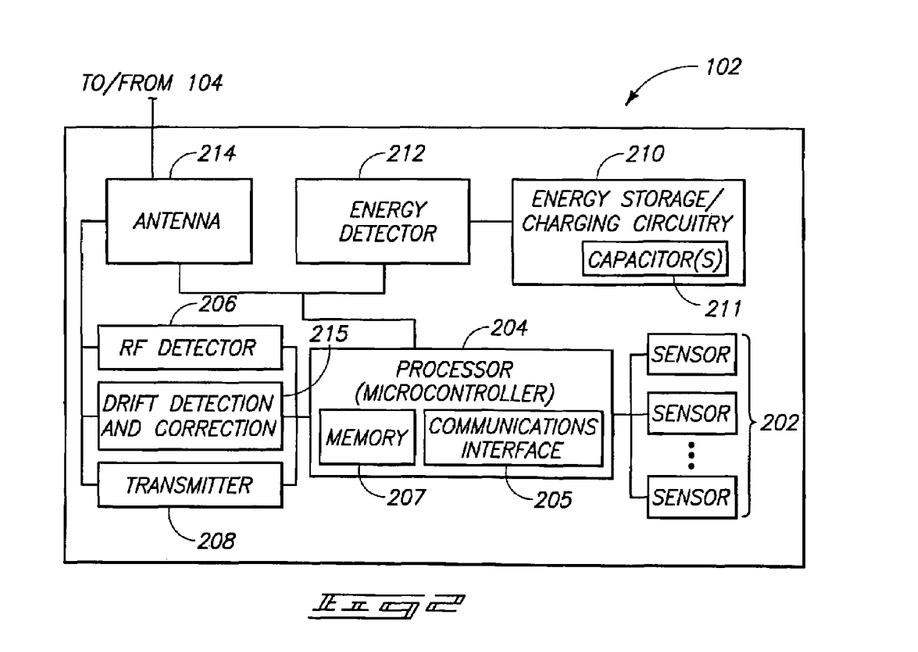
FIG. 2 is a block diagram showing details of the sensor platform of FIG. 1, in accordance with various embodiments.

In one exemplary embodiment, the sensor platform 102 is configured to be passive (e.g., inactive state or inactive mode) until it is energized by the reader 104. For purposes of this application, "passive" is defined as "not having an on-board power source." Further details of the sensor platform 102 are described below with reference to the embodiment as shown in FIG. 2.

The reader 104, generally referred henceforth as reader 104, is configured to communicate with and interrogate the sensor platform 102 in order to retrieve information gathered by the sensor platform 102. The reader 104 performs as a user-interface to sensor platform 102 and it may be fixed in a spaced relationship with sensor platform 102, or configured to be mobile (e.g., carried by a user or mounted on a vehicle) to enable on-the-fly measurements. In one example, reader 104 communicates with sensor platform 102 via short range telemetry, thereby eliminating a need for physical wires to establish communication between the sensor platform 102 and the reader 104. For example, short range telemetry communication may be performed in the frequency range of about 125 kHz to about 134 kHz. Other frequencies could be used.

Functionally, the sensor platform 102 is activated and powered by the reader 104. After being activated, the sensor platform 102 obtains measurements of the structure within which it is embedded and responds back to the reader 104 with the measurements. An induction field (e.g., return induction field) generated by the sensor platform 102 is configured to carry measurements made by the sensor platform 102 to the reader 104. In one embodiment, the measurements are sent via a response signal that is superimposed on, for example, a return induction field generated by the sensor platform 102. Reader 104 is configured to detect a radio frequency (RF) signal generated by the sensor platform 102.

Although the wireless sensor system 100 of FIG. 1 is shown to include only one sensor platform 102 for purposes of simplicity, it will be appreciated that a plurality of such sensor apparatuses are possible. Further, individual ones of such sensor apparatuses may be independently interrogated by the reader. Also, a remote interrogation device (e.g., remote computer) may be used to remotely interrogate such sensor apparatuses.

Figure 4:
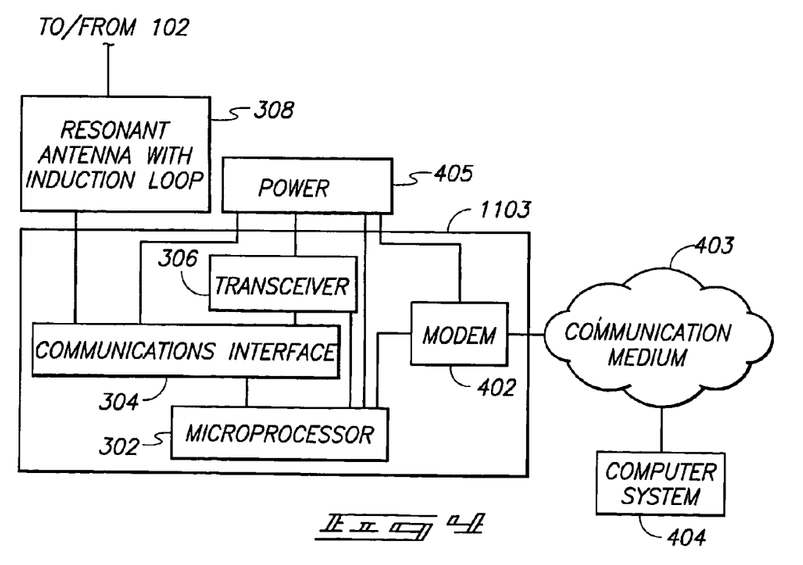
FIG. 4 is a block diagram of the reader shown in FIG. 1, in accordance with some embodiments.

Further details of the reader 104 are set forth below with reference to the embodiment as shown in FIG. 4.

Referring to FIG. 2, a detailed block diagram of sensor platform 102 in accordance with some embodiments is shown. The sensor platform 102 includes one or more sensors 202, a processor or processing circuitry 204, an RF detector 206, a transmitter 208, energy storage or charging circuitry 210, an energy detector 212, and an antenna 214. The sensor platform 102 further includes, in some embodiments circuitry 215 for detecting and correcting drift. The circuitry 215 is omitted in other embodiments.

The sensor platform 102 is inactive until energized by a remote power source (e.g., reader 104). After being activated, the sensor platform 102 polls onboard sensors 202 that are configured to obtain measurements of the environment where such sensors are disposed and communicate with reader 104 with sensor measurements.

In operation, according to one embodiment, in order to obtain sensor measurements, reader 104 transmits energy in, for example, the form of an alternating magnetic field, which is captured and stored in charging circuitry 210 of the sensor platform 102. The captured energy energizes the processing circuitry 204 configured to provide instructions to the one or more sensors 202 to perform measurements. Such measurements (e.g., moisture content, temperature, pressure, determination of contaminants such as chlorides, etc.) are then digitized. After such measurements are made and digitized, processing circuitry 204 provides power to transmitter 208 of sensor platform 102 and controls modulation such as frequency shift keying (FSK) to impress the respective digitalized measurements on the transmitted waveform, which may be subsequently decoded by reader 104. After the measurements are transmitted to the reader 104, the sensor platform 102 reverts back to inactive or sleep state and accumulates energy to perform a subsequent cycle of measurements.

In another embodiment, reader 104 may be configured to not only provide energy in the form of an alternating magnetic field but also provide instructions to sensor platform 102. For example, sensor platform 102 may be instructed to report measurements made by a particular sensor among sensors 202 or to adjust the operating range of such sensor.

The sensors 202 that are employed can be sensors for sensing variables or parameters such as, for example, moisture, water potential, temperature, pressure, contamination, and/or radiation. Individual ones of the sensors 202 may be configured to sense distinct environmental variables. For example, one set of sensors may be configured to sense temperature while another set of sensors may be configured to sense pressure, etc. Thus, in one embodiment, sensor platform 102 may include an assortment of sensors 202 individually configured to sense a variety of environmental variables. Accordingly, individual ones of the sensors 202 may be interrogated by reader 104 to read measurements.

The processor 204 is configured to control various functions performed by the sensor platform 102 including controlling various components (e.g., 206–215) comprised in the sensor platform 102. Further, processor 204 is configured to change status of sensor platform 102 from an inactive state (e.g., sleep mode) to an active state (e.g., wakeup mode) in order to perform a series of preprogrammed steps to determine (a) if a measurement is being requested by reader 104, (b) acquire readings or measurements from one or more sensors 202 if instructed to do so by either reader 104 or processor 204, and (c) transmit the acquired readings or measurements to the reader 104. While various alternatives are possible, in some embodiments, the processor 204 is a Programmable Interface Controller PIC16F876-04/SP by Microchip Technology, Inc. which includes onboard non-volatile memory (e.g., 207), multiple analog-to-digital (A/D) converter channels, and digital communication ports (e.g., communication interface 205). An advantage of using a processor that has on-board analog-to-digital converters is that multiple additional chips are not needed, thus allowing for a small sized sensor platform package. In alternative embodiments, a processor is used that does not include onboard analog-to-digital converters and instead external analog-to-digital converters are employed.

As noted above, the processor 204 is configured to control the logic necessary for power management (e.g., charging circuitry 210), operation of one or more sensors 202, and communication with reader 104.

The processing circuitry 204 may be configured to process instructions received from reader 104 and measurements received from sensors 202. The processing circuitry 204 may comprise circuitry configured to execute programming. In an exemplary embodiment, as noted above, processing circuitry 204 may be implemented as a microprocessor or other structure configured to execute executable applications of programming including, for example, software and/or firmware instructions. Other exemplary embodiments of processing circuitry 204 include hardware logic, PGA, FPGA, ASIC, and/or other structures. These examples of processing circuitry 204 are for illustration, and other configurations are possible for implementing operations discussed herein.

In one example, processing circuitry 204 may be configured to include instructions or executable applications responsive to a request from reader 104. Exemplary commands or executable applications received by processing circuitry 204 can include, for example, commands, control functions to store energy in charging circuitry 210, providing power to the sensors 202 to perform measurements, processing of measurements made by the sensors 202, and transmission of the measurements to the reader 104.

Communications interface 205 provided in processing circuitry 204 may be configured to communicate electronic data externally of sensor platform 102. For example, communications interface 205 enables communication with respect to reader 104 via antenna 214. In one embodiment, communications interface 205 may be arranged to provide input/output communications with respect to one or more sensors 202 and reader 104. The communications interface 205 may comprise a serial port, a parallel port, USB port, EIO slot, network interface card, wireless architecture, or other appropriate configuration capable of communicating electronic data.

The RF detector 206 is configured to determine if the reader 104 is transmitting an energy field to the sensor platform 102.

The processing circuitry 204 includes a memory 207 configured to store measurements made by sensors 202. In one exemplary case, the memory 207 may be configured to store electronic data (e.g., electronic or digital sensor measurements), file systems having one or more electronic files, programming such as executable instructions (e.g., software and/or firmware), and/or other digital information, and may include processor-usable media. Sensor measurements may be loaded into the memory 207 after such measurements are made by the sensors 202. As noted above, such measurements may be made by the sensors 202 in response to receiving instructions from the processing circuitry 204 or from the reader 104 (FIG. 1).

Processor-usable media includes any article of manufacture which can contain, store, or maintain programming, data and/or digital information for use by or in connection with an instruction execution system including processing circuitry in the exemplary embodiment. For example, exemplary processor-usable media may include physical media such as electronic or semiconductor media. Some more specific examples of processor-usable media include, but are not limited to, random access memory, read only memory, flash memory, cache memory, and/or other configurations capable of storing programming, data, or other digital information.

The transmitter 208 is configured to transmit measurements made by the sensors 202 to the reader 104 via the antenna 214.

The energy storage circuitry or charging circuitry 210 is configured to store energy generated by an alternating electromagnetic induction field of the reader 104. The charging circuitry 210 includes one or more capacitors, or one or more energy storage capacitor banks or sets. Individual capacitor banks include one or more energy storing capacitors. Individual capacitor banks are designed to provide power for predetermined operations of the sensor platform 102. For example, a first capacitor bank may be designed to provide power to run the basic operations or short-term operations of the sensor platform 102 which may include providing power to sensors designed to consume low power, while a second capacitor bank may be designed to provide power for extended operations (e.g., collect data for a number of hours or days) of the sensor platform 102 without resorting to extracting power from the reader 104. The processing circuitry 204 is configured to control charging and usage of the various capacitor banks of the charging circuitry 210.

In one embodiment, energy generated by the alternating magnetic field of the reader 104 is stored in the capacitor banks of the charging circuitry 210, and measurements by the sensors 202 are initiated by the processing circuitry 204 after a predetermined charge, as measured by the energy detector 212, has been stored in the charging circuitry 210. Accordingly, in this exemplary embodiment, energy is stored in the charging circuitry 210 at a first time period and measurements by the sensors 202 is performed at a later time period after the charging circuitry 210 has been energized with a predetermined level of charge.

However, in another embodiment, charging circuitry 210 may be energized by the reader 104 while measurements are being made by sensors 202 even when the charging circuitry 210 is not energized to the predetermined charge level. Accordingly, there is no delay to perform measurements by the sensors 202.

The energy detector 212, as noted above, provides an indication of the amount of charge stored in the charging circuitry 210. The processing circuitry 204 is configured to poll the energy detector 212 to determine if the charging circuitry 210 is energized to a predetermined level. The processing circuitry 204 after determining such energized state of the charging circuitry 210 as indicated by the energy detector 212 polls the RF detector 206 to determine if reader 104 (FIG. 1) is still transmitting the electromagnetic energizing field. If not, the processing circuitry 204 determines that the reader 104 is not tuned to the sensor platform 102, and the processing circuitry 204 interrogates the one or more sensors 202 to initiate measurements by the sensors 202.

Antenna 214 includes a resonant circuit configured for capturing electromagnetic energy (e.g., generated from an induction field) from reader 104 as well as transmitting measurements made by sensors 202 to reader 104. As noted above, after sensors 202 are interrogated by processing circuitry 204, measurements made by sensors 202 are obtained and digitized by the processing circuitry 204. Such measurements are stored in memory 207 of the processing circuitry 204. The processing circuitry 204 then provides power to transmitter 208 which in turn drives the antenna 214 to transmit the measurements to the reader 104.

Digitalization of measurements includes performing frequency-shift keying which is accomplished by switching a small capacitance in and out of a resonant circuit of the antenna 214, and controlling the switching by the processing circuitry 204.

Figure 3:
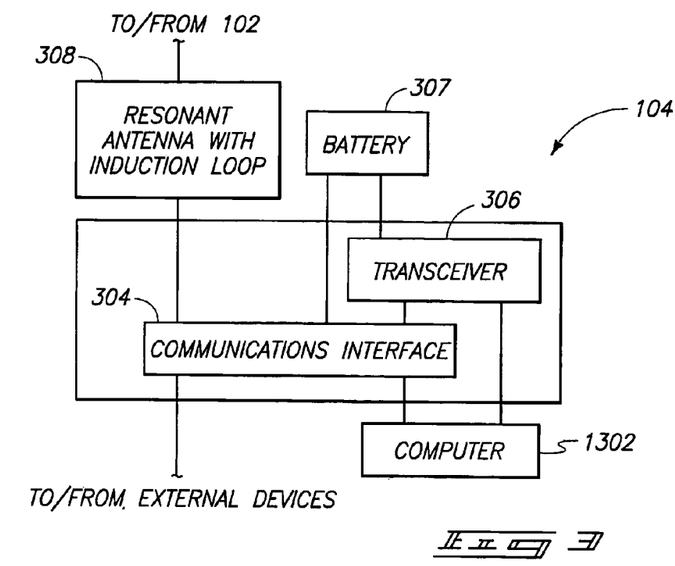
FIG. 3 is a block diagram showing details of the reader of FIG. 1, in accordance with various embodiments.

FIG. 3 is a block diagram of the reader shown in FIG. 1 in accordance with some embodiments of the invention. The reader 104 includes a communications interface 304, a transceiver 306, and is used with a resonant antenna 308.

An external computer (e.g., a laptop computer) 1302, external of the reader 104, can be used to generate commands and ask various sensor platforms to respectively provide their readings (FIG. 3). Each sensor platform 102 can have one reading or multiple stored readings to be read. Alternatively the reader 104 can include its own microprocessor 302 (FIG. 4) configured to control various operations of the reader 104 including activating sensor platform 102 either instead of or in addition to an external computer. In some embodiments, the computer 1302 may be configured to provide instructions to the sensor platform 102 to interrogate the sensors 202 as well as to provide energy to the sensor platform 102, such energy being provided by way of electromagnetic induction field generated by the reader 104. For example, the sensor platform 102 may be instructed by the microprocessor 302 or microprocessor 1302 to report a measurement made by a specific sensor among a plurality of sensors provided in the sensor platform 102, or to adjust the operating range of such sensor. Other than providing instructions that are specific to the reader 104, architectural configuration of microprocessor 302 (FIG. 4) may be similar to processing circuitry 204 as shown in FIG. 2, and accordingly such details of processing circuitry 204 which were described above with reference to FIG. 2 will not be repeated.

The communications interface 304 may be configured to communicate electronic data externally of the reader 104 as well as routing data within the reader 104. For example, the communications interface 304 enables communication with respect to the sensor platform 104 via the antenna 308. In one embodiment, the communications interface 304 may be arranged to communicate instructions to interrogate the sensors 202 or adjust an operating range of such sensors. The communications interface 304 may comprise a parallel port, USB port, EIO slot, network interface card, and/or other appropriate configuration capable of communicating electronic data.

The transceiver 306 is configured to transmit and receive data to and from external devices (e.g., sensor platform 102, sensors 202, and an external computer, as shown in FIG. 4). For example, the transceiver 306 may be configured to receive measurement information from the transmitter 208 (FIG. 2) as well as transmit interrogation signals to the sensors 202 of the sensor platform 102 to perform measurements.

Information directed to and received from the transceiver 306 passes via the antenna 308. In one case, the antenna 308 uses large diameter, frequency tuned loops having multi-strand wire. For example, in some embodiments, the antenna has a diameter above 66 inches. Such provides several square feet of coverage for multiple sensor apparatuses or platforms, such as, for example, the sensor platform 102 (FIG. 1). Due to the multi-strand wire in the antenna loop, high current/high amplitude magnetic fields may be generated providing an extended working range. Other embodiments and diameters are, of course, possible.

Efficiency of the antenna 308 is increased, in some embodiments, by increasing the cross-sectional area cut by the induction field, thereby improving energy transfer. A drift from desired resonant frequency by either the sensor platform 102 or the reader 104 detunes circuitry of the antenna 308. Efficiency of the antenna 308 may also be increased by minimizing resonant frequency drift due to varying environmental conditions. The resonant drift frequency may be detected and corrected to modify antenna characteristics to regain the desired resonant frequency. Also, the antenna 308 is configured such that the antenna's resonant frequency may be varied to match the frequency of an object or structure in which the sensor platform 102 is embedded.

In one exemplary case, the antenna 214 (FIG. 2) of the sensor platform 102 includes wire wrapped inductors on long ferrite rods having dimensions of ½×7 inch. Such dimensions provided efficient collection of energy at extended ranges, and transmission of measurements, obtained by the sensors 202 to the reader 104. Other embodiments are, of course, possible.

FIG. 4 is a block diagram schematic showing a reader 1103, antenna 308, and computer system 404 in accordance with another embodiment wherein elements like those illustrated in FIG. 3 are identified using like reference numerals. The antenna 308 is separate from and not commonly housed with the reader 1103. In this embodiment, the processor 302 is communicatively coupled to a modem 402 which is configured to send and receive information to/from a remote device 404 (e.g., computer system or data logger) external of reader 1103 via a communication medium 403 (e.g., wired or wireless). For example, sensor data or information measured by the sensors 202 (FIG. 2) and received by the reader 1103 may be further transmitted to the remote device 404. Information from the remote device 404 may be sent to the reader 1103 via the modem 402, and such information may include instructions to the sensor platform 102 (FIG. 1) or to the sensors 202 (FIG. 2) to initiate measurements by the sensors 202. In one exemplary case, to forward measurements from the reader 1103 to the remote device 404, the transceiver 306 (FIG. 3) is tuned such that its passband is centered on one of the frequency components of a modulated wave. Such produces, for example, an analog output from the transceiver 306. In the illustrated embodiment, the output is level shifted to become a serial signal (e.g., RS-232 signal) which is captured by a serial port of the remote device 404, which may define a data logger.

Using the embodiment of FIG. 4, a user may provide the reader 1103 in operational proximity to the sensor platform 102. In one exemplary case, the maximum separation between the sensor platform 102 and antenna 308 is determined by a level at which a charging voltage (e.g., to charge the sensor platform 102 by the reader 104 or 1103) is less than the voltage stored in charging circuitry 210 (FIG. 2). An advantage of the embodiment of FIG. 4 is the ability to read measurements made by sensors 202 at a remote location. Thus, a user need not physically carry reader 104 to obtain measurements made by sensors 202.

In one embodiment, the sensor platform 102 may be disposed or embedded in a test environment, such as for example, a concrete structure (e.g., a bridge), to monitor the structural integrity of the structure. For example, the sensor platform 102 may be used to detect the infiltration of chlorides or other harmful materials affecting the structural integrity of the structure. If such harmful materials are detected prior to their arrival at reinforcing bars (rebar) of the concrete structure, then the affected concrete structure may be removed and the structure may be rebuilt without involving significant expense and effort, thereby extending the lifespan of the structure and reducing maintenance costs.

Figure 5:
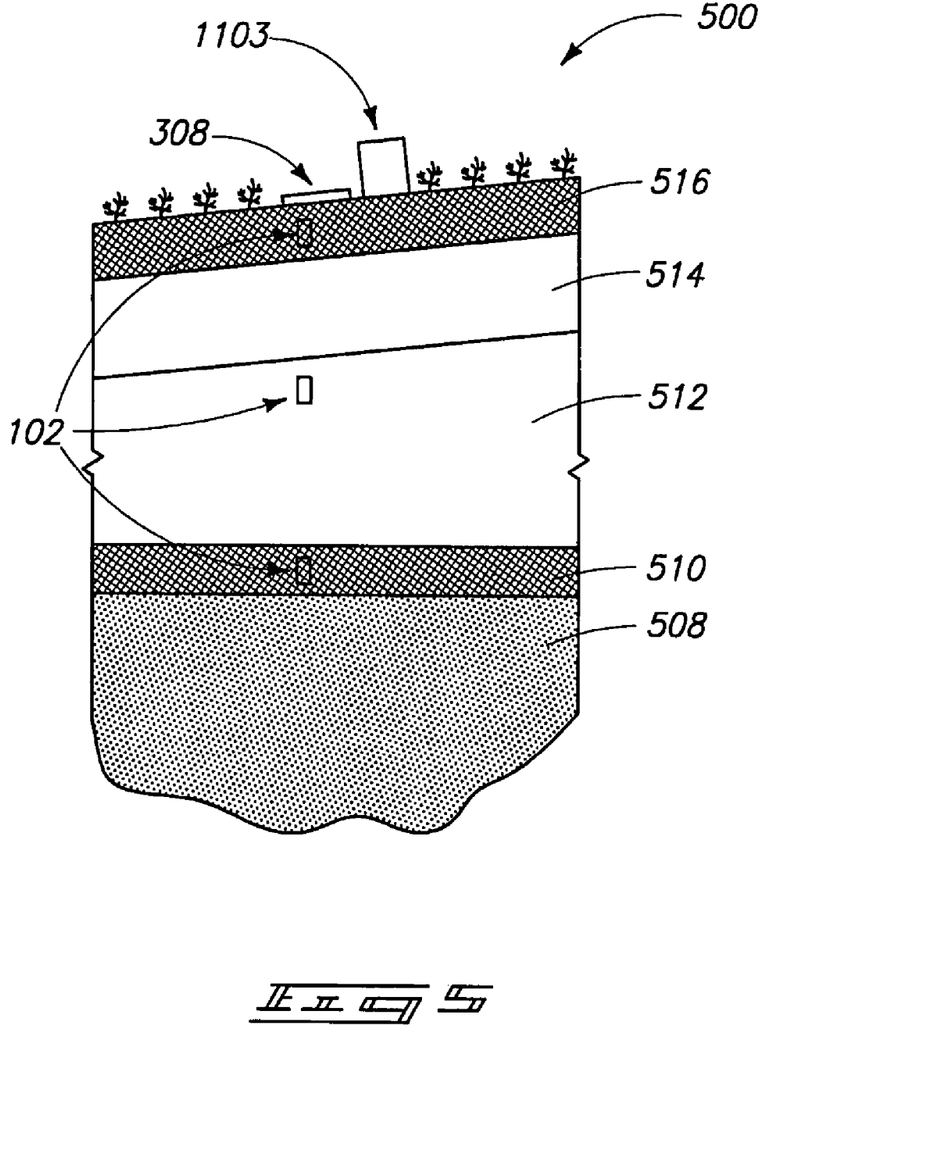
FIG. 5 illustrates the system of FIG. 1 in accordance with some embodiments, used for sensing underground parameters.

In another embodiment, shown in FIG. 5, one or more sensor platforms 102 are provided in below a cap 514 and/or above the cap 514. More particularly, FIG. 5 illustrates a plurality of sensor platforms 102 buried below ground in a soil waste site or stewardship land 500 including landfill 508, backfill 510, fill material 512 to create a required or desired grade, the cap 514, and topsoil 516. The cap retards the downward flow of moisture, e.g., by an actual barrier or by evapotranspiration from vegetation. The cap within a landfill generally does not exceed two meters in depth, even for complex designs. Other arrangements are possible. For example, the material 512 may be omitted.

In such a site, including contaminated wastes, water flux (e.g., through the cap 514) is just one parameter that could be monitored.

Use of multiple sensor platforms 102 with a single reader is possible, allowing measurement of vertical moisture profiles and area monitoring. Moisture filtration maps can be generated from such data.

Monitoring the performance of landfill barriers can include determining when a barrier is operating within previously determined limits, or to calculate performance parameters such as water flux through the cap 514. Associated with remediation of a contaminated site can be years of post-closure monitoring to assure or verify performance. At least one sensor platform 102 is mounted below the cap 514, while the inductive loop antenna 308 typically is placed on top of the barrier when in operation, or may be buried below the surface.

The sensor platform 102 is "read" by a short-range induction field that both powers and activates the sensor platform 102 and carries sensor information via a response signal. This is particularly useful for embodiments in which no power is available on-site. The sensor or sensors 202 are also driven from this power. The sensor platform 102 generates a response signal superimposed on a field by the processing circuitry or processor 204 (FIG. 2). The processor 204 may be an embedded processor (e.g., commonly housed with a sensor 202).

In some embodiments, when sufficient energy is stored, the embedded processor 204 will "wakeup" and perform a series of preprogrammed steps to 1) see if a measurement is being requested, 2) acquire readings from the attached sensors if instructed to do so, and 3) transmit the results back to the reader. In some embodiments, while measurements are being made, energy is drained-from the capacitor or capacitors in charging circuitry 210 (FIG. 2). In some embodiments, after the measurement results have been transmitted to the reader 1103 (FIG. 4), the system reverts back to a sleep state and starts to accumulate energy for the next cycle. As a result of this design, the sensor platform 102 operates within a limited power budget that requires sensors to be low power and/or to have limited on-time duration for sensors having high power demands.

In some embodiments, the maximum separation of the sensor platform from the antenna 308 is determined by the point at which the charging current is less than the sleep current. The sensor platform 102 is able to operate with the antenna 308 of the reader 104 or 1103 at separation distances of, for example, up to 9½ feet.

A low-frequency magnetic field, e.g., approximately 125 kHz in some embodiments, carries the energy and information. Low frequency has acceptable penetration in moist soil. Parameters relating to penetration depth are the soil electrical conductivity and the frequency of the penetrating field.

For the reader 104 or 1103 to acquire a reading from the sensor platform 102, in some embodiments, the general sequence is as follows. The reader 104 or 1103 first sends out energy in the form of a pulsating magnetic field, which is captured and stored in a capacitor 211 within the sensor platform 102. The captured energy then powers the microcontroller or processor 204, which instructs a sensor 202 to perform a measurement. This value (e.g., moisture content) is then digitized by an analog-to-digital converter included in the processor 204. At that point, the processor 204 causes the sensor platform's transmitter 208 to be powered, and also controls modulation, such as frequency-shift keying, to impress the digital reading on the transmitted waveform. Subsequent decoding is performed by the reader 104 or 1103. In some embodiments, the reader 104 or 1103 supplies instructions to the sensor platform 102, as well as energy. For example, the sensor platform 102 might be instructed to report the value of a particular sensor 202 or to adjust the operating range of a sensor 202.

Two-way communications allow multiple or separate sensor platforms 102 to be addressed and read. Included is the ability to implement multiple sensor 202 types in a single package, e.g., moisture, temperature, or other sensor types that meet speed and low power consumption requirements.

The energy demand created by the sensors 202 suggests that the efficiency of the resonant antenna systems should be optimized for maximum energy transfer. Two approaches to improve efficiency have been employed. The first is to increase the cross-sectional area cut by the induction field using the antenna design described above. This improves coupling, thereby improving energy transfer. However, note that a compromise between antenna size and efficiency exists. The second is to minimize resonant frequency drift due to changing environmental conditions. A drift from the desired resonant frequency by either the reader 104 or 1103 or sensor platform 102 "detunes" the circuitry. In some embodiments drift is detected and corrected via circuitry 215 in the sensor platform and/or reader to modify antenna characteristics to regain the desired resonant frequency. The circuitry 215 is omitted in other embodiments.

In some embodiments, the antenna 214 (FIG. 2) is a magnetic field induction loop on a ferrite core, used for both receiving and transmitting. The loop is adapted, in some embodiments, from a transponder manufactured by TIRIS™ (TIRIS™ is a subsidiary of Texas Instruments).

The sensor platform is advantageously used with low power, fast response sensors (e.g., a volumetric water sensor consumes 2.5 mA @ 5 Vdc for 10 ms equals 125 micro Joule). On the other hand, a water potential sensor (heated thermocouple) is inherently a high power, slow response sensor (e.g., 50 mA @ 1.56 Vdc for 30 seconds equals 2.34 Joule). A water potential sensor consumes much more than a volumetric water sensor such as, for example, 19,000 times the energy of the volumetric water sensor. If a water potential sensor is desired to be included in the sensor platform, 2.34 Joule of charge storage requires, for example, a 0.2 Farad capacitor at 5 Vdc. Charge-up times are, for example, 100 minutes at a six foot depth.

While volumetric water content provides some indication of the performance of the cap 514, a measurement of the energy status of the pore water is preferred to determine the amount of water flowing through the cap 514 and the direction of movement. The energy status of pore water is better determined by measuring the soil water potential using any of a number of sensor types. A heat dissipation sensor for measuring soil water potential has been determined to be accurate and reliable and defines one of the sensors 202 in some embodiments. More particularly, in some embodiments, one of the sensors 202 is defined by a heat dissipation matrix water potential sensor manufactured by Campbell Scientific, Inc. (CSI). This particular sensor was selected, for some embodiments, based on power consumption.

There may be other sensing needs of interest, such as subsurface volumetric moisture, temperature, pressure, and water potential, contamination (e.g., VOC, heavy metals, etc.). Therefore, in some embodiments, the sensors 202 comprise sensors for sensing one or more of volumetric moisture, temperature, pressure, and water potential, contamination, and/or radiation above and/or below the cap 514.

In operation of embodiments including the reader of FIG. 3, after sensor platforms have been installed, a user who wishes to take measurements only needs a reader 104 or 1103, a computer 1302 (for readers that use external computers), a battery 307 (e.g., a 12 volt battery), and an antenna 308. The user places the antenna 308 over sensor platforms 102 (see FIG. 5) and hooks up the battery 307 (FIG. 3) to the reader. The antenna, a resonant circuit in some embodiments, is used both for capturing energy from the reader and transmitting data back to the reader. The user, using the reader 104 or 1103 interrogates respective sensor platforms 102. The sensor platforms can get their power at the same time. While FIG. 5 shows the sensor platforms 102 lined up one on top of the other, they could be offset from each other (in the direction parallel to the surface) as long as they all fall within the magnetic field generated by the antenna 308. In some embodiments, the antenna 308 is a coil of wire having a diameter of, for example, about 6 feet and forming the general shape of a circle when viewed from above the surface. In some embodiments, the sensor platforms 102 each are about 6 to 7 inches high. In some embodiments, the reader is about 4 inches by 4 inches.

As energy builds in charging circuitry 210, the processor 204 begins to operate and polls the charging circuitry 210 to determine if the capacitor is fully charged. In some embodiments, when the capacitor 211 is fully charged, about 5 volts are available. When that condition is achieved, the RF detector 206 is polled to determine if the reader 104 or 1103 is still transmitting the electromagnetic energizing pulse or field. If not, the reader 104 or 1103 has stopped to listen. If so, the processor 204 interrogates the sensor platform 102, which requires applying power to it. The sensor platform 102 digitizes information from a sensor 202 and transmits a reply using, for example, frequency shift keying to modulate a carrier generated by the sensor platform 102.

After taking readings, the antenna, reader, battery, and computer are moved to another location.

In some embodiments, an induction antenna 308 and a reader 1103 including a telemetry unit or modem 402 (see FIG. 4) for communication with a remote data logger 404 are provided above ground or buried above the cap. The data logger may be included in the reader 1103 and may be proximate the induction antenna instead of remote from the reader 1103. The embodiment of FIG. 4 is useful when a user does not wish to visit a site to take readings. Power source 405 may be, for example, a solar power generator. Communications to the user can take place via, for example, a satellite link or other remote communication link, if no conventional phase land line phone line is available. The data logger can be located at any convenient spot, and linked by wires, conventional radio frequency telemetry, or by modem, to the reader.

Figure 6:
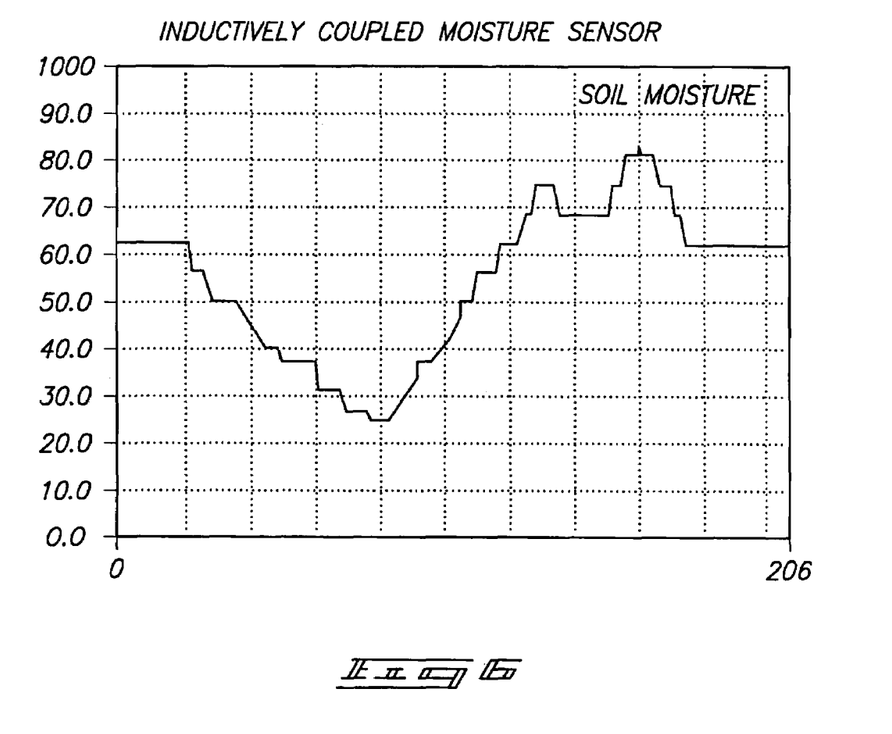
FIG. 6 is a plot of a real time data stream plotted by a data logger, using data gathered by the wireless sensor system of FIG. 1.

FIG. 6 shows an example of real time data stream plotted by a data logger.

The outer surface of the sensor platform housing can be fully inert (e.g., plastic), so life expectancy is long. Accelerated aging tests for integrated circuits often predict failure rates that exceed 100 years, even for continuous operation at 55° C. ambient temperature (see, Microchip Technology, Inc. "Product Reliability Technical Publication DS1100SK", 1998). Failure rates at low temperatures can be substantially lower.

In various embodiments, a sensor interface and/or other features described in commonly assigned patent application Ser. No. 09/665,229, filed Sep. 18, 2000, entitled "Real- Time Data Acquisition and Telemetry Based Irrigation Control System", naming as inventors John M. Slater and John M. Svoboda as inventors which application is incorporated herein by reference, are employed.

Potential uses of various embodiments of the invention include long term stewardship, subsurface science, and agriculture. Advantages of various embodiments of the invention include limiting potential damage on surface by equipment, personnel, and/or weather.

Embodiments of the invention have advantages for circumstances such as barrier caps where a sensor must be buried beneath a surface that must not be penetrated by wires, in an area where an above ground sensor or wiring might be damaged by equipment or personnel, or in other areas where it may be desirable to avoid visual impact or conceal sensors to avoid theft or vandalism.

The organizations that have responsibility for the cleanup of these waste sites will have a long term need for surface barrier technologies, particularly barrier performance monitoring technologies. Specifically, they will need automated and remote sensing soil moisture monitoring technologies that can be used to interrogate the large soil volumes associated with a surface barrier, such as those provided by the above described embodiments.

Aspects of the invention provide various advantages, which in some embodiments include, (a) no wires to impede measurements or barrier construction activity, and there is no penetration of the barrier, (b) sensor platform can be robust and small and useful, for example, as an insertion-mounted retrofit to existing caps, (c) data acquisition can be remote and automated, (d) multiple sensors may be incorporated into a single sensor platform or probe, (e) multiple sensor platforms may be interrogated by a single reader, and (f) the sensor platform is low-cost and deployable in large numbers.

The sensor platform 102 can be used for various applications in addition to those described above. The sensor platform 102 can be used, for example, to sense chemical species within a sealed container, and chemical process parameters such as acidity, with a probe traveling in a process stream (which could be within a living organism).

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of measuring a parameter of a landfill including a cap, without passing wires through the cap, the method comprising:

burying at least two sensor apparatuses in the landfill, wherein at least one sensor apparatus is below the cap and at least one sensor apparatus is above the cap;

providing a reader capable of communicating with the sensor apparatuses via radio frequency;

placing an antenna above the barrier, spaced apart from the sensor apparatuses;

coupling the antenna to the reader either before or after placing the antenna above the barrier;

providing power to the sensor apparatuses via the antenna, by generating a field using the reader;

accumulating and storing power in the sensor apparatuses;

sensing parameters of the landfill using the sensor apparatuses while using power;

transmitting the sensed parameters to the reader via a wireless response signal; and determining water flux through the cap using the sensed parameters.

2. A method in accordance with claim 1, wherein the sensor apparatuses includes a capacitor and wherein accumulating and storing power comprises storing power in the capacitor.

3. A method in accordance with claim 1, wherein the sensor apparatuses comprises a processor, a radio frequency detector coupled to the processor, a radio frequency transmitter coupled to the processor, and a plurality of sensors coupled to the processor.

4. A method of measuring a parameter of a landfill including a cap, without passing wires through the cap, the method comprising:

burying at least two sensor apparatuses in the landfill, wherein at least one sensor apparatus is below the cap and at least one sensor apparatus is above the cap, the sensor apparatuses including a processor, a radio frequency detector coupled to the processor, a radio frequency transmitter coupled to the processor, and a sensor coupled to the processor;

providing a reader capable of communicating with the sensor apparatuses via short range telemetry communication;

placing an antenna above the barrier, spaced apart from the sensor apparatuses;

coupling the antenna to the reader either before or after placing the antenna above the barrier;

providing power to the sensor apparatuses, via the antenna, by generating a field using the reader;

accumulating and storing power in the sensor apparatuses from the field;

sensing parameters of the landfill using the sensor apparatuses while using power;

transmitting the sensed parameters to the reader via a wireless response signal; and determining water flux through the cap using the sensed parameters.

5. A method in accordance with claim 4, and comprising sensing subsurface moisture using the sensor apparatuses.

6. A method in accordance with claim 4 wherein the processor has an active state and a sleep state, and wherein, in response to power being provided from the antenna, the processor switches to the active state.

7. A method in accordance with claim 4, wherein the processor has an active state and a sleep state, wherein the sensor apparatuses includes a capacitor, wherein accumulating and storing power comprises storing power in the capacitor, and wherein, after transmitting the sensed parameter, the processor switches to the sleep state and the capacitor accumulates energy for use in subsequent sensing.

8. A method in accordance with claim 4, wherein the processor has an active state and a sleep state, wherein the sensor apparatuses includes a capacitor, wherein accumulating and storing power comprises storing power in the capacitor other than when sensing, and wherein, after transmitting the sensed parameter, the processor switches to the sleep state and the capacitor accumulates energy for use in subsequent sensing.

9. A method in accordance with claim 4, wherein sensing parameters comprises sensing temperature.

10. A method in accordance with claim 4, wherein sensing parameters comprises sensing pressure.

11. A method in accordance with claim 4, wherein sensing parameters comprises sensing contamination.

12. A method in accordance with claim 4, wherein sensing parameters comprises sensing radiation.

13. A method in accordance with claim 4, wherein sensing parameters comprises sensing water potential.

14. A method in accordance with claim 4, wherein the sensor apparatuses are generally lined up one on top of the other.

15. A method in accordance with claim 4, and comprising addressing one sensor apparatus, using the reader, while power is being provided to the other sensor apparatuses.

16. A method in accordance with claim 4, wherein the sensor apparatuses are each arranged to be located under the antenna.

17. A method in accordance with claim 4, wherein a sensor in at least one of the sensor apparatuses is an analog sensor, and wherein the processor includes an on-board analog-to-digital converter coupled to the analog sensor.

18. A method in accordance with claim 6 and further comprising causing the sensor apparatuses to revert to the sleep state in response to the transmitting to the reader.

19. A method in accordance with claim 4, wherein the reader sends a command to the sensor apparatuses at a frequency of between about 125 kHz to 134 kHz.

20. A method in accordance with claim 4, wherein the reader is stationary.

21. A method in accordance with claim 4, wherein the reader is mobile.

22. A system for measuring a parameter of a landfill including a cap, without passing wires through the cap, the system comprising:
at least two sensor apparatuses configured to be buried in the landfill, wherein at least one sensor apparatus is under the cap and at least one sensor apparatus is above the cap;
a reader capable of communicating with the sensor apparatuses via radio frequency; and
an antenna configured to be placed above the barrier, spaced apart from the sensor apparatuses
and to be coupled to the reader either before or after placing the antenna above the
barrier, the reader being configured to provide power to the sensor apparatuses, via the antenna, by generating a field, the sensor apparatuses being configured to accumulate and store power from the field, the sensor apparatuses being configured to sense a parameter of the landfill while using power, and the sensor apparatuses being configured to transmit the sensed parameter to the reader via a wireless response signal;
wherein the reader is configured to determine water flux through the cap using the sensed parameter from the at least one sensor apparatus under the cap and the sensed parameter from the at least one sensor apparatus above the cap.

23. A system in accordance with claim 22, wherein the sensor apparatuses includes a capacitor and wherein the sensor apparatuses are configured to accumulate and store power in the capacitor.

24. A system in accordance with claim 22, wherein the sensor apparatuses comprises a processor, a radio frequency detector coupled to the processor, a radio frequency transmitter coupled to the processor, and a plurality of sensors coupled to the processor.

25. A system for measuring parameters of a landfill including a cap, without passing wires through the cap, the system comprising:
at least two sensor apparatuses configured to be buried in the landfill, wherein at least one sensor apparatus is below the cap and at least one sensor apparatus is above the cap, the sensor apparatuses including a processor, a radio frequency detector coupled to the processor, a radio frequency transmitter coupled to the processor, and a sensor coupled to the processor;
a reader capable of communicating with the sensor apparatuses via radio frequency; and
an antenna configured to be placed above the barrier, spaced apart from the sensor apparatuses and to be coupled to the reader either before or after placing the antenna above the barrier, the reader being configured to provide power to the sensor apparatuses, via the antenna, by generating a field, the sensor apparatuses being configured to accumulate and store power from the field, the sensor apparatuses being configured to sense a parameter of the landfill while using power, and the sensor apparatuses being configured to transmit the sensed parameter to the reader via a wireless response signal;
wherein the reader is configured to determine water flux through the cap using the sensed parameter from the at least one sensor apparatus below the cap and the sensed parameter from the at least one sensor apparatus above the cap.

26. A system for measuring a parameter of a landfill in accordance with claim 25, wherein the sensor apparatuses are configured to sense subsurface moisture.

27. A system for measuring a parameter of a landfill in accordance with claim 25, wherein the processor has an active state and a sleep state, and wherein, in response to power being provided from the antenna, the processor switches to the active state.

28. A system for measuring a parameter of a landfill in accordance with claim 25, wherein the processor has an active state and a sleep state, wherein the sensor apparatuses include a capacitor configured to accumulate and store power and wherein, after transmitting the sensed parameter, the processor switches to the sleep state and the capacitor accumulates energy for use in subsequent sensing.

29. A system for measuring a parameter of a landfill in accordance with claim 25, wherein the processor has an active state and a sleep state, wherein the sensor apparatuses include a capacitor configured to accumulate and store power and wherein, after transmitting the sensed parameter, the processor switches to the sleep state and the capacitor accumulates energy for use in subsequent sensing.

30. A system for measuring a parameter of a landfill in accordance with claim 25, wherein at least one of the sensor apparatuses includes a temperature sensor.

31. A system for measuring a parameter of a landfill in accordance with claim 25, wherein at least one of the sensor apparatuses includes a pressure sensor.

32. A system for measuring a parameter of a landfill in accordance with claim 25, wherein at least one of the sensor apparatuses is configured to sense contamination by a predetermined contaminant.

33. A system for measuring a parameter of a landfill in accordance with claim 25, wherein at least one of the sensor apparatuses includes a radiation sensor.

34. A system for measuring a parameter of a landfill in accordance with claim 25, wherein at least one of the sensor apparatuses includes a water potential sensor.

35. A system for measuring a parameter of a landfill in accordance with claim 25, wherein the sensor apparatuses are generally lined up one on top of the other.

36. A system for measuring a parameter of a landfill in accordance with claim 25, wherein the reader selectively addresses one sensor apparatus while power is being provided to the other sensor apparatuses.

37. A system for measuring a parameter of a landfill in accordance with claim 25, wherein the sensor apparatuses are each arranged to be located under the antenna.

38. A system for measuring a parameter of a landfill in accordance with claim 25, wherein at least one of the sensor apparatuses includes an analog sensor, and wherein the processor includes an on-board A/D converter coupled to the analog sensor.

39. A system for measuring a parameter of a landfill in accordance with claim 27, wherein the sensor apparatuses are configured to switch to the sleep state in response to transmitting to the reader.

40. A system for measuring a parameter of a landfill in accordance with claim 25, wherein the reader is configured to selectively send a command to the sensor apparatuses at a frequency of between about 125 kHz to 134 kHz.

41. A system for measuring a parameter of a landfill in accordance with claim 25, wherein the reader is stationary and includes a modem.

42. A system for measuring a parameter of a landfill in accordance with claim 25, wherein the reader is mobile.

* * * * *